United States Patent [19]
Wilson

[11] 3,902,603
[45] Sept. 2, 1975

[54] RETAINER BAR ASSEMBLY FOR MAIL CARRYING RACK

[75] Inventor: James D. Wilson, Newport Beach, Calif.

[73] Assignee: Banner Metals Division of Intercole Automation, Inc., Compton, Calif.

[22] Filed: July 1, 1974

[21] Appl. No.: 484,753

[52] U.S. Cl. .................. 211/126; 211/4; 312/216
[51] Int. Cl.² ........................................ B62B 11/00
[58] Field of Search..... 312/216, 217, 107.5, 138 R; 211/126, 4; 280/47.35, 79.3

[56] References Cited
UNITED STATES PATENTS

| | | | |
|---|---|---|---|
| 1,856,913 | 5/1932 | Herkert | 312/216 |
| 2,928,681 | 3/1960 | Wilson | 280/79.3 X |
| 2,987,192 | 6/1961 | Metzler et al. | 211/4 |
| 2,987,782 | 6/1961 | Kurowski | 312/138 R |
| 3,454,320 | 7/1969 | Olree | 312/217 |
| 3,797,842 | 3/1974 | Swick et al. | 211/126 X |

Primary Examiner—Roy D. Frazier
Assistant Examiner—Robert W. Gibson, Jr.
Attorney, Agent, or Firm—Jessup & Beecher

[57] ABSTRACT

A retainer bar assembly is provided comprising a vertical bar pivotally mounted at one corner of a rack to be movable from a stowed position in which trays may be inserted into or removed from the open front of the rack, to a locked operative position in which the bar extends up across the front of the rack to hold the trays securely in the rack, as the rack is transported from one location to another.

2 Claims, 3 Drawing Figures

PATENTED SEP 2 1975  3,902,603

RETAINER BAR ASSEMBLY FOR MAIL CARRYING RACK

BACKGROUND OF THE INVENTION

A wheeled rack which has general utility in handling mail, or other articles, is described in Copending Application Ser. No. 477,805, filed June 10, 1974. The rack described in the copending application is constructed to carry trays of mail, the trays being supported on rails within the rack.

The wheeled rack described in the copending application has particular utility for carrying trays of sorted, or partially sorted mail from a main post office to substation post offices, and for carrying bags of unsorted mail back from the sub-station post offices to the main office. The trays are supported on the rails in the rack in a tiered condition to be inserted into and removed from the open front of the rack. The retainer bar assembly of the present invention constitutes a simple mechanism which may be manually moved between a locked operative position and a stowed position, and which in its locked operative position prevents the trays from falling out of the front of the rack, as the rack is transported from one location to another.

DETAILED DESCRIPTION OF THE ILLUSTRATED EMBODIMENT

Figure 1:
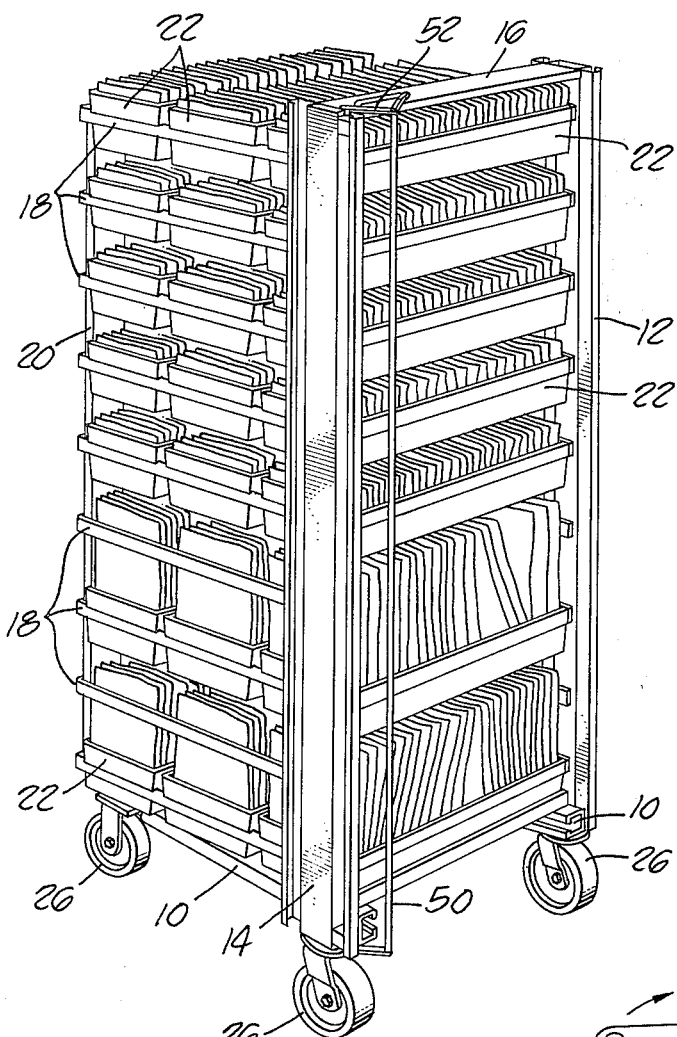
FIG. 1 is a perspective representation of a wheeled rack silimar to the rack described and claimed in the copending application, and which includes a retainer bar assembly constructed in accordance with the present invention.

The wheeled rack of FIG. 1 includes a lower U-shaped frame member 10, with two upright posts 12 and 14 at the front corners of the frame. The posts 12 and 14 may be formed of channel-like metal strips, of the illustrated configuration. A transverse brace 16 extends across the upper ends of the posts 12 and 14.

A plurality of U-shaped strip members 18 are welded, or otherwise attached, to the posts 12 and 14, with the rear ends of the members 18 being supported by upright strips, such as the strip 20. The members 18 form a plurality of spaced and parallel rails on each side of the rack assembly, and these rails removably receive mail-containing trays 22 through the open front of the rack.

The rack also has a plurality of wheels 26 pivotally mounted to the frame 10, at each corner of the frame. The wheels are pivotally mounted on the underside of the frame and extend downwardly therefrom as casters.

The bar assembly of the invention comprises a vertical bar 50 which is welded or otherwise attached to a link 52 at the upper end of the wheeled rack, the other end of the link 52 being welded, or otherwise attached to a pin 54 which, in turn, is pivotally mounted in a socket 56 at the upper forward corner of the post 14.

Figure 3:
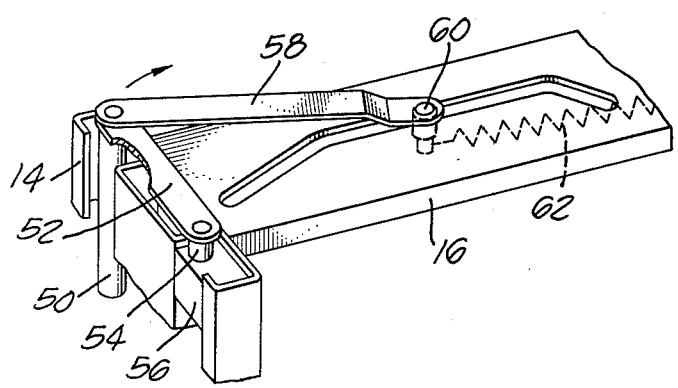
FIG. 3 is a fragmentary perspective representation of the rack of FIG. 1, with the bar assembly in its stowed position.
Figure 2:
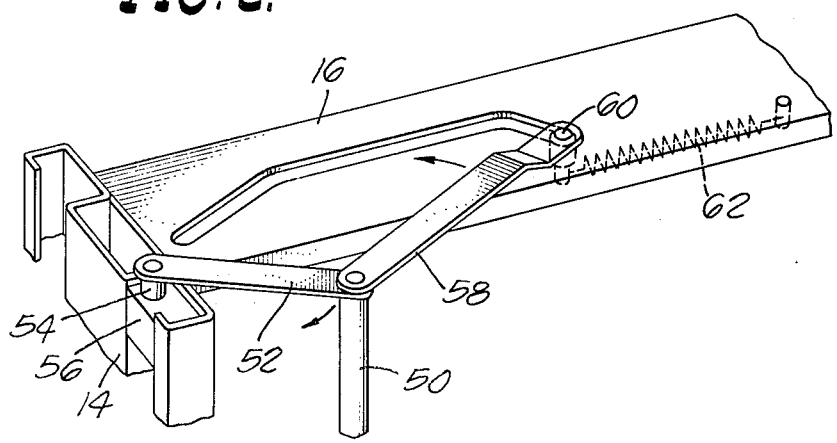
FIG. 2 is a fragmentary perspective representation of the rack of FIG. 1, with the bar assembly locked in its operative position.

As shown in FIGS. 2 and 3, the link 52 is pivotally coupled to a further link 58, and a pin 50 at the other end of the link 58 extends down into a slot in the top brace 16. A spring 62 biases the link 58 towards the right in FIGS. 2 and 3.

When the bar 50 is in the operative, or closed, position of FIG. 2, the spring-biased link 58 holds the bar 50 in the closed position and against the forward edges of the trays 22, to prevent the trays from falling out of the front of the rack. To release the trays, it is necessary to grasp the bar 50, and to turn it and the link 52 about the axis of the pin 54, so that the bar is turned to its open, stowed, position of FIG. 3. In the open position of FIG. 3, the spring-biased link 58 holds the bar 50 firmly against the side of the post 14 to permit trays to be inserted into the rack and withdrawn from the rack. Then, by turning the bar 50 back to its closed position, the trays may again be retained firmly and securely within the rack.

When the bar 50 is in its closed position, any force exerted on the bar 50 by the trays cannot move the bar outwardly from the plane of the front of the rack. This is because the bar, when in its closed position, is locked by the link 58 against such movement. The only way in which the bar 50 can be moved to its open, stowed position of FIG. 3, is to grasp the bar and turn it along an arcuate path about the vertical axis of the pin 54. The spring 62 causes the link 58 to operate in an over-center spring-biased manner to lock the bar in either its open or closed positionas the bar is turned in one direction or the other along the arcuate path against the force of the spring.

The invention provides, therefore, an improved and simplified bar assembly for use in conjunction with a wheeled rack, and which serves securely to reatin the trays within the rack. The bar may easily be moved to its open position, when it is desired to remove the trays from the rack, or to insert new trays into the rack.

It will be appreciated that although a particular embodiment of the invention has been shown and described, modifications may be made. It is intended in the claims to cover the modifications which come within the spirit and scope of the invention.

What is claimed is:

1. In a rack assembly which includes a pair of spaced and parallel upright posts defining an open front end, and a plurality of spaced and parallel elongated horizontal members affixed to the posts to provide support rails on each side of the rack for trays inserted into the rack through the open front end thereof, and a transverse top brace affixed to the tops of the posts; the combination of: a first linkage member having one end coupled to the upper end of one of said posts for pivotal movement about a vertical axis; a vertical bar member having its upper end coupled to the other end of said linkage member for arcuate movement about said vertical axis between a closed position in which the bar extends upwardly across the front of the rack and an open stowed position in which the bar is positioned adjacent to said one of said post members, and which includes a second linkage member having one end coupled to said other end of said first linkage member; and a pin mounted to the other end of said second linkage member and extending down into a slot in said top brace member.

2. The combination defined in claim 1, and which includes a spring coupled to the other end of said linkage member and biasing said pin in a direction away from said vertical axis.

* * * * *